TAG PROTEIN FOR INCREASING WATER SOLUBILITY AND HEAT STABILITY OF TARGET PROTEIN, AND FUSION PROTEIN COMPRISING SAME

US012459978B2

(12) United States Patent
Kweon et al.

(10) Patent No.: US 12,459,978 B2
(45) Date of Patent: Nov. 4, 2025

(54) TAG PROTEIN FOR INCREASING WATER SOLUBILITY AND HEAT STABILITY OF TARGET PROTEIN, AND FUSION PROTEIN COMPRISING SAME

(71) Applicant: MVRIX Co., Ltd., Hwaseong-si (KR)

(72) Inventors: Dae-Hyuk Kweon, Suwon-si (KR); Yun-Jeong Park, Suwon-si (KR); Ki-Jun Jeong, Daejeon (KR); Yoon-Jin Bae, Hwaseong-si (KR)

(73) Assignee: MVRIX Co., Ltd., Hwaseong-si (KR)

( * ) Notice: Subject to any disclaimer, the term of this patent is extended or adjusted under 35 U.S.C. 154(b) by 902 days.

(21) Appl. No.: 17/761,709

(22) PCT Filed: Sep. 18, 2020

(86) PCT No.: PCT/KR2020/012640
§ 371 (c)(1),
(2) Date: Mar. 18, 2022

(87) PCT Pub. No.: WO2021/054774
PCT Pub. Date: Mar. 25, 2021

(65) Prior Publication Data
US 2022/0340628 A1 Oct. 27, 2022

(30) Foreign Application Priority Data
Sep. 20, 2019 (KR) .................. 10-2019-0116019

(51) Int. Cl.
*C07K 14/47* (2006.01)
*C12N 9/02* (2006.01)
*C12N 9/10* (2006.01)
*C12N 15/63* (2006.01)

(52) U.S. Cl.
CPC .......... *C07K 14/4702* (2013.01); *C12N 15/63* (2013.01); *C07K 2319/74* (2013.01)

(58) Field of Classification Search
None
See application file for complete search history.

(56) References Cited

U.S. PATENT DOCUMENTS 6,803,203 B1 * 10/2004 Anderson ................ C07K 7/08
530/300

FOREIGN PATENT DOCUMENTS

KR   10-2004-0059490 A   7/2004
KR   10-2007-0019340 A   2/2007

OTHER PUBLICATIONS

Santiago et al. (Vaccine. Jun. 29, 2012; 30(31): 4606-4616) (Year: 2012).*
Park, Yunjeong, "Stabilization of proteins inside cells by immobilization on plasmid", Master's Thesis, Sungkyunkwan University, Department of Integrative Biotechnology, Aug. 2019, pp. 1-50.
Jong Hyun Park, "Development of a plasmid display system with an Oct-1 DNA-binding domain suitable for in vitro screening of engineered proteins", Journal of Bioscience and Bioengineering, The Society for Biotechnology, 2013, pp. 246-252, vol. 116, No. 2.
Park, Yunjeong et al., "Plasmid Display for Stabilization of Enzymes Inside the Cell to Improve Whole-Cell Biotransformation Efficiency", Frontiers in Bioengineering and Biotechnology, Jan. 2020, pp. 1-10, vol. 7, Article 444.
Young-Wook Chin, et al., "Enhanced production of 2'-fucosyllactose in engineered *Escherichia coli* BL21star(DE3) by modulation of lactose metabolism and fucosyltransferase", Journal of Biotechnology 210 (2015) pp. 107-115.
International Search Report for PCT/KR2020/012640 dated Jan. 13, 2021.
Written Opinion for PCT/KR2020/012640 dated Jan. 13, 2021.

* cited by examiner

*Primary Examiner* — Manjunath N Rao
*Assistant Examiner* — Jae W Lee
(74) *Attorney, Agent, or Firm* — Sughrue Mion, PLLC

(57) ABSTRACT

The present invention relates to a fusion protein in which a target protein and an Oct-1 protein-containing protein tag are linked, an expression structure comprising a nucleotide sequence encoding same, a recombinant vector including same, and a transformed cell including same.

5 Claims, 10 Drawing Sheets

Specification includes a Sequence Listing.

A

B

C

A

B

C

D

E

TAG PROTEIN FOR INCREASING WATER SOLUBILITY AND HEAT STABILITY OF TARGET PROTEIN, AND FUSION PROTEIN COMPRISING SAME

CROSS REFERENCE TO RELATED APPLICATIONS

This application is a National Stage of International Application No. PCT/KR2020/012640 filed Sep. 18, 2020, claiming priority based on Korean Patent Application No. 10-2019-0116019 filed Sep. 20, 2019, the entire disclosures of which are incorporated herein by reference.

TECHNICAL FIELD

The present invention relates to a fusion protein in which a target protein is linked to a protein tag including an Oct-1 protein, an expression structure including a nucleotide sequence encoding the same, a recombinant vector including the same, and a transformed cell including the same.

BACKGROUND ART

It is important for enzymes, which are present in great diversity in living cells, to be expressed in a soluble state so as to maintain the activity thereof within cells. When the soluble expression of enzymes involved in a metabolic pathway for forming products is problematic, a variety of methods can be applied to improve the solubility, that is, the water solubility, of the enzymes.

Many strategies using fusion proteins to increase the solubility of target proteins such as enzymes have been developed. For example, proteins such as GST (glutathione S-transferases), MBPs (maltose-binding proteins), or SUMOs (small ubiquitin-like modifiers) are known to improve soluble expression of proteins due to the high solubility thereof when fused with target proteins. However, in many cases, even when a tag for increasing solubility is attached to a target protein, the solubility of the protein does not increase. When a tag is attached to a target protein, it affects the structure formation of the target protein, causing the original function thereof to be lost. It is not a foregone conclusion that a specific protein tag is always beneficial for solubility of fusion proteins.

That is, only after attaching various protein tags to target proteins needing to be fused in order to realize soluble and active expression of proteins, target proteins suitable for the circumstances can be selected. For this reason, various protein tags for improving the solubility and activity of fusion proteins are being studied.

Meanwhile, hemagglutinin (HA) is a spherical surface protein that plays an important role in the invasion of influenza into cells, and is immunogenic and known to be difficult to express in a soluble form in *Escherichia coli*. Conventional production of vaccines for influenza viruses is performed using inactivated viruses or HA or neuraminidase (NA) proteins extracted from virus particles. However, such vaccines still have problems in terms of safety for young children and the elderly because they contain viral lipids, etc. that have not been completely removed during the purification process.

DISCLOSURE

Technical Problem

The present inventors found that the solubility of a fusion protein to which Oct-1 was added as a protein tag is remarkably increased, that the solubility of the fusion protein was improved when Oct-1 was added to either the amino terminus or the carboxyl terminus of the target protein, and that the solubility of the fusion protein was improved even when a binding sequence (BS) was not present in the plasmid.

Therefore, the present invention is made to provide a protein tag wherein, by expressing a fusion protein having a structure, in which the protein tag is added to a target protein, in cells, the solubility and thermal stability of the fusion protein can be increased, and by maintaining the expression thereof in an active form in the cells, the efficiency of biotransformation can be increased. In order to achieve the above object, a fusion protein is prepared by linking Oct-1 as a protein tag to the amino terminus or carboxyl terminus of the target protein, the expression of soluble and active fusion protein is identified, a whole-cell catalyst is prepared using the expressed active protein, and the increased production of useful substances by the fusion protein is confirmed.

However, the objects of the present invention are not limited to those described above. Other objects not described herein will be clearly understood to those skilled in the art from the following description.

Technical Solution

In accordance with a first aspect of the present invention, the above and other objects can be accomplished by the provision of a fusion protein including a target protein and a protein tag linked to the target protein and including an octameric transcription factor-1 (Oct-1) protein.

In accordance with a second aspect, provided is an expression construct including a nucleotide sequence encoding the fusion protein according to the first aspect.

In accordance with a third aspect, provided is a recombinant vector including the expression construct according to the second aspect.

In accordance with a fourth aspect, provided is a transformed cell including the recombinant vector according to the third aspect.

The aspects described above are merely exemplary and should not be construed as limiting the present invention. In addition to the exemplary embodiments described above, additional embodiments and examples described with reference to the drawings and the detailed description may also exist.

Advantageous Effects

According to the present invention, a fusion protein in which an Oct-1 protein is linked to the amino terminus or carboxyl terminus of a target protein is prepared, so the soluble expression of the target protein in cells can be improved, expression in an active form can be induced, the active structure thereof can be maintained, proteins having excellent thermal stability can be produced, and thus the productivity of useful substances can be improved when cells expressing the proteins are used for biotransformation. In addition, microorganisms redesigned using a metabolic engineering method, in which target proteins mediate major reactions, can perform whole-cell catalytic reactions even at high temperatures.

BEST MODE

Figure 1:
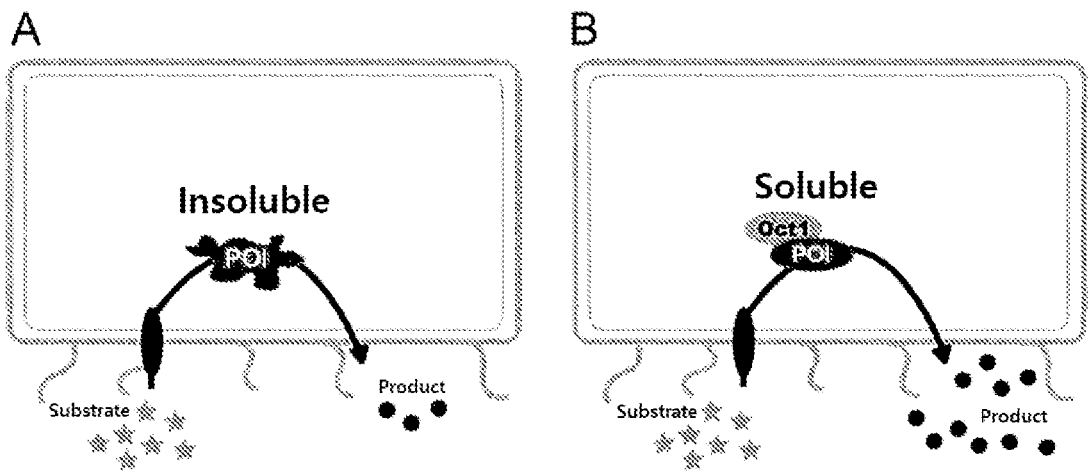
FIG. 1 is a schematic diagram illustrating changes in whole-cell catalytic efficiency due to the improvement in solubility of a fusion protein according to an embodiment of the present invention.

Hereinafter, embodiments of the present invention will be described in detail with reference to the accompanying drawings such that they can be easily implemented by those skilled in the art. However, the present invention may be implemented in several different forms and is not limited to the embodiments described herein. Also, parts not related to the description are omitted from the drawings for clear description of the present invention.

As used throughout this specification, it will be understood that, when a part is referred to as "comprising" an element, the term permits the presence of other elements, and does not preclude the presence or addition of such other elements unless otherwise defined.

As used herein, the terms "about or approximately" or "substantially" are intended to have meanings close to numerical values or ranges specified with an allowable error in production and substances and intended to prevent accurate or absolute numerical values disclosed for understanding of the present invention from being illegally or unfairly used by any unconscionable third party. As used throughout this specification, the terms "~~ step" or "step of ~" does not mean "step for".

As used herein, the term "combination (s) thereof" included in the expression of the Markush form means a mixture or combination of one or more selected from the group consisting of the elements described in the expression of the Markush form, and is meant to include one or more selected from the group consisting of the elements.

As used herein, the expression "A and/or B" encompasses both "A or B" and "A and B".

As used herein, the term "nucleotide" or "polynucleotide" refers to a nucleic acid, preferably DNA or RNA.

As used herein, the term "vector" means a DNA product containing a DNA sequence operably linked to a suitable regulatory sequence capable of expressing the DNA in a suitable host. Vectors may be plasmids, phage particles or simply potential genomic inserts. When transformed into suitable hosts, vectors may be replicated or perform functions independent of the host genomes, or some thereof may be integrated with the genomes. Plasmids are currently the most commonly used forms of vector. Therefore, as used herein, the terms "plasmid" and "vector" are often used interchangeably.

As used herein, the term "recombinant plasmid" refers to a recombinant vector capable of expressing a target protein in an appropriate host cell, and is a type of expression vector including essential regulatory elements operably linked so as to express the inserted recombinant gene. The recombinant plasmid may include, as elements contained in a conventional recombinant plasmid, expression regulatory elements such as promoters, operators, start codons, and stop codons, and the start codons and stop codons are generally considered to be parts of nucleotide sequences encoding polypeptides. The recombinant plasmid must have activity when introduced into host cells and must be in frame with the coding sequence. The promoter of the vector may be constitutive or inducible.

Hereinafter, the fusion protein, the expression construct, the recombinant vector, and the transformed cell according to the present invention will be described in detail with reference to the embodiments, examples, and drawings. However, the present invention is not limited to these embodiments, examples, and drawings.

In a first aspect, the present invention is directed to a fusion protein including a target protein and a protein tag linked to the target protein and containing an octameric transcription factor-1 (Oct-1) protein.

The fusion protein of the present invention may include a target protein, and Oct-1, which is a protein tag that is fused with the target protein to increase soluble and active expression of the target protein, thus being useful for mass production of useful substances through protein production and metabolic engineering technology. Specifically, in the present invention, by expressing octameric transcription factor-protein of interest (Oct-1-POI) or protein of interest-octameric transcription factor-1 (POI-Oct-1), which is the fusion protein of the target protein and the oct-1 protein tag, the active-form expression of the fusion protein is increased.

According to the present invention, the fusion protein in which Oct-1 is linked to the target protein is expressed in a soluble form in cells to be used for the production of a soluble target protein, and is expressed in an active form in cells to improve the efficiency upon mass production of useful substances through a whole-cell catalytic reaction and to enhance the yield of high value-added products. FIG. 1 is a schematic diagram illustrating a change in whole-cell catalytic efficiency due to the improvement in solubility of the fusion protein according to an embodiment of the present invention.

In addition, the fusion protein according to the present invention can bind to a plasmid in a stable state in the cytoplasm where the biotransformation reaction occurs to form an intracellular immobilized enzyme using the plasmid as an immobilization carrier and thus efficiently increase product yield when applied to enzymes used for biotransformation. For example, compared to a target protein to which no protein tag is bound, the fusion protein according to the present invention can increase product yield by about 50% or more, about 100% or more, about 200% or more, about 300% or more, or about 400% or more.

In addition, the present invention may provide an intracellular immobilized enzyme system (IIES), which is a multi-purpose platform developed for intracellular protein stabilization. IIES forms a plasmid-protein complex under the influence of the DNA-binding protein and the binding sequence on the plasmid. A plasmid is known to be stable in cells, so the enzyme can be stabilized in the cytoplasm, like an immobilized enzyme bound to a solid surface, when used as an immobilization carrier.

When IIES is applied to prepare a whole-cell biocatalyst through metabolic engineering, the fusion protein of the present invention can substantially increase the productivity of high-addition products. In the examples of the present invention, increased production of 2'-fucosyllactose and 3'-fucosyllactose was observed. Accordingly, the plasmid-protein complex formed according to the production of the fusion protein of the present invention forms an immobilized enzyme, and the plasmid construct can act as an intracellular immobilization carrier.

According to one embodiment of the present invention, the Oct-1 protein may be encoded by the nucleotide sequence set forth in SEQ ID NO: 1, but is not limited thereto, and the Oct-1 protein may include mutations, such as insertions, deletions, substitutions, additions, and translocations, which do not substantially affect the function of the fusion protein of the present invention. For example, the Oct-1 protein may be derived from a human, but is not limited thereto.

According to one embodiment of the present invention, the protein tag may be linked to the amino terminus or the carboxyl terminus of the target protein, but is not limited thereto. That is, even when the protein tag is linked either to the amino terminus or to the carboxyl terminus of the target protein, the solubility and/or thermal stability of the fusion protein can be improved due to the protein tag.

In one embodiment of the present invention, the target protein may include at least one selected from the group consisting of antigens, antibodies, cell receptors, enzyme proteins, structural proteins, serum and cellular proteins, but is not limited thereto.

In one embodiment of the present invention, the enzyme protein may be selected from fucose transferase, Baeyer-Villiger monooxygenases (BVMOs), and combinations thereof, but is not limited thereto.

In one embodiment of the present invention, the antigen may be selected from hemagglutinin (HA), neuraminidase (NA), and combinations thereof, which are surface antigen proteins in the envelope of influenza virus, but is not limited thereto.

As used herein, the term "surface antigen", which is interchangeable with "cellular membrane antigen", refers to a membrane-bound protein present in the membrane of a cell. In the present invention, "surface antigen" may be interpreted to mean a membrane-bound protein linked to a lipid bilayer of a virus having a lipid bilayer envelope, but the surface antigen is not particularly limited thereto, and may be, for example, hemagglutinin (HA), neuraminidase (neuraminidase; NA), or the like, which is an influenza virus of the surface antigen. As used herein, the term "hemagglutinin (HA)" refers to a transmembrane protein that is a type of surface antigen of the influenza virus and is composed of an HA1 subunit and an HA2 subunit that can be cleaved by trypsin. It is known that the HA1 subunit binds to sialic acid, whereas the HA2 subunit induces cell membrane fusion under low pH conditions.

For example, the fucose transferase may include, but is not limited to, a 1,2'-fucose transferase encoded by the nucleotide sequence of SEQ ID NO: 2 and/or a 1,3'-fucose transferase encoded by the nucleotide sequence of SEQ ID NO: 3. For example, the Baeyer-Villiger monooxygenases (BVMOs) may be one encoded by the nucleotide sequence of SEQ ID NO: 4, but is not limited thereto. For example, the hemagglutinin may be represented by the amino acid sequence of SEQ ID NO: 5 or encoded by the nucleotide sequence encoding the amino acid sequence of SEQ ID NO: 5, but is not limited thereto.

When a fusion protein using, as a target protein, a fucose transferase, for example, 1,2'-fucose transferase or 1,3'-fucose transferase, is expressed in a host cell, 1,2'-fucose transferase or 1,3'-fucose transferase is produced using lactose as a carbon source. The products, 2'-fucosyllactose and 3'-fucosyllactose, are the main components of human milk oligosaccharides, and are useful as functional substances having a prebiotic effect and an effect of preventing pathogenic infection.

When a fusion protein using hemagglutinin as a target protein is expressed in a host cell such as *Escherichia coli*, it can be useful for the development of influenza drugs or vaccines and research on the molecular mechanism of influenza infection.

The fusion protein of the present invention does not necessarily require a DNA-binding sequence present outside the Oct-1 sequence in order to exhibit the functions thereof. Specifically, as described above, the fusion protein of the present invention uses the plasmid as an immobilization carrier by forming a plasmid-protein complex. It is generally known that an Oct-1 binding sequence (BS) is required in order to attach Oct-1 to plasmid DNA. However, the Oct-1 binding sequence is not essential in order to bind the fusion protein of the present invention to a plasmid to thereby form a complex, so the design, production and subsequent biotransformation of the fusion protein can be performed more easily.

In a second aspect, the present invention is directed to an expression construct including a nucleotide sequence encoding the fusion protein according to the first aspect. Details described relating to other aspects of the present invention may be equally applied to the second aspect of the present invention, unless otherwise specified.

In a third aspect, the present invention is directed to a recombinant vector including the expression construct according to the second aspect. Details described relating to other aspects of the present invention may be equally applied to the third aspect of the present invention, unless otherwise specified.

In one embodiment of the present invention, the recombinant vector may not include an Oct-1 binding sequence outside the Oct-1 gene, but is not limited thereto.

For example, the recombinant vector of the present invention may further include other nucleotide sequences that can contribute to the production of proteins expressing genes and having normal functions. For example, the nucleotide sequence that may be further included in the recombinant vector may include a nucleotide sequence encoding an enhancer and a polyA signal, and also a sequence encoding a tag for purifying the resulting fusion protein, for example, a histidine tag, but is not limited thereto.

In a fourth aspect, the present invention is directed to a transformed cell including the recombinant vector according to the third aspect. Details described relating to other aspects of the present invention may be equally applied to the fourth aspect of the present invention, unless otherwise specified.

As used herein, the term "transformation" refers to any action that causes genetically stable inheritance so that the expression construct or the recombinant vector can move into the genome of host cells to express the desired fusion protein. The transformation may be performed using any transformation method, and may be easily performed according to a conventional method known in the art. General transformation methods include $CaCl_2$ precipitation, a Hanahan method, which is a $CaCl_2$ method using a reducing material called "DMSO" (dimethyl sulfoxide) to increase efficiency, electroporation, calcium phosphate precipitation, protoplasmic fusion, agitation using silicon carbide fibers, agrobacterium-mediated transformation, transformation using PEG, and dextran sulfate, lipofectamine and drying/inhibition-mediated transformation.

The host cells to be transformed may be selected without limitation from among microorganisms, and may be microorganisms from a genus such as *Escherichia, Mannheimia, Rhodobacter*, or *Methylobacterium*, and are preferably *E. coli*, but are not limited thereto.

The cells may be cultured using any known culture method, such as batch culture, continuous culture, and fed-batch culture. Culture conditions suitable for the selected host cells may be easily adjusted by those skilled in the art, and the medium that is used herein should contain all nutrients essential for the growth and survival of the cells.

Mode For Invention

Hereinafter, the present invention will be described in more detail with reference to the following examples, but the scope of the present invention is not limited to the examples, and includes variations and technical concepts equivalent thereto.

EXAMPLE

Example 1: Construction of Recombinant Plasmid to Produce Fusion Protein

Figure 2:
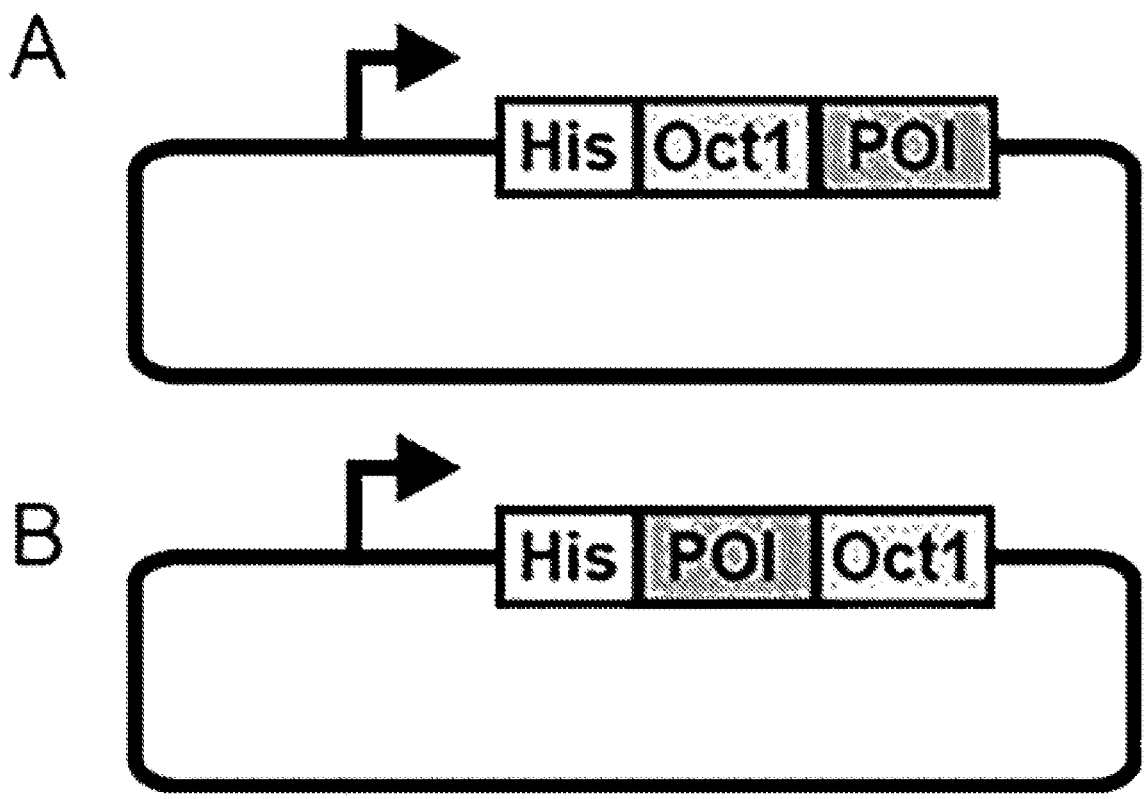
FIG. 2 is a schematic diagram illustrating a recombinant plasmid for expression of a fusion protein fused with an Oct-1 protein tag.

A recombinant plasmid was constructed for the preparation of the fusion protein. An *E. coli* Top10 strain was used as a strain for cloning, and a gene (set forth in SEQ ID NO: 2) encoding 1,2-fucosyltransferase (1,2'-FT) derived from *Pedobacter saltans* was used as a target gene used for constructing the recombinant plasmid. In addition, a human-derived octameric transcription factor-1 (Oct-1) gene (set forth in SEQ ID NO: 1) was used as a DNA-binding protein. In addition, for the construction of the recombinant plasmid, a gene (set forth in SEQ ID NO: 3) encoding 1,3'-fucosyltransferase (1,3-FT) derived from *H. pylori* or a gene (set forth in SEQ ID NO: 4) encoding Baeyer-Villiger monooxygenases (BVMOs) derived from *Pseudomonas putida* KT2440 was used. [72] A schematic diagram of a recombinant plasmid for expression of a fusion protein fused with an Oct-1 protein tag is shown in FIG. 2. The POI (protein of interest) is a protein targeted for active expression, wherein the Oct-1 is attached to the N-terminus (A of FIG. 2) or C-terminus (B of FIG. 2) of the POI.

Example 2: Expression of Fusion Protein in *E. coli*

*E. coli* BL21 (DE3) was used to express the fusion protein from the recombinant plasmid constructed in Example 1 above. 1,2-fucose transferase (1,2-FT), which is a type of fucose transferase derived from *Pedobacter saltans* (PS), was used as the POI.

A transformant obtained by transformation using the recombinant plasmid was incubated at 37° C. in an LB medium containing 50 μg/ml of kanamycin. When an $OD_{600}$ reached 0.5, the transformant was added with 0.1 mM IPTG, and the culture product was further incubated at 25° C. for 4 hours.

For further analysis, the cells were collected by centrifugation at 7,000 rpm for 5 minutes and the cell precipitate was disrupted using Bugbuster reagent. Total cell lysate (T) was obtained from the disrupted cell solution and was centrifuged at 9,700 g for 10 minutes to obtain a soluble cell lysate (S) from the supernatant. Then, the fusion protein expressed from the recombinant plasmid was analyzed using 12% sodium dodecyl sulfate-polyacrylamide gel electrophoresis (SDS-PAGE) (FIG. 3).

Figure 3:
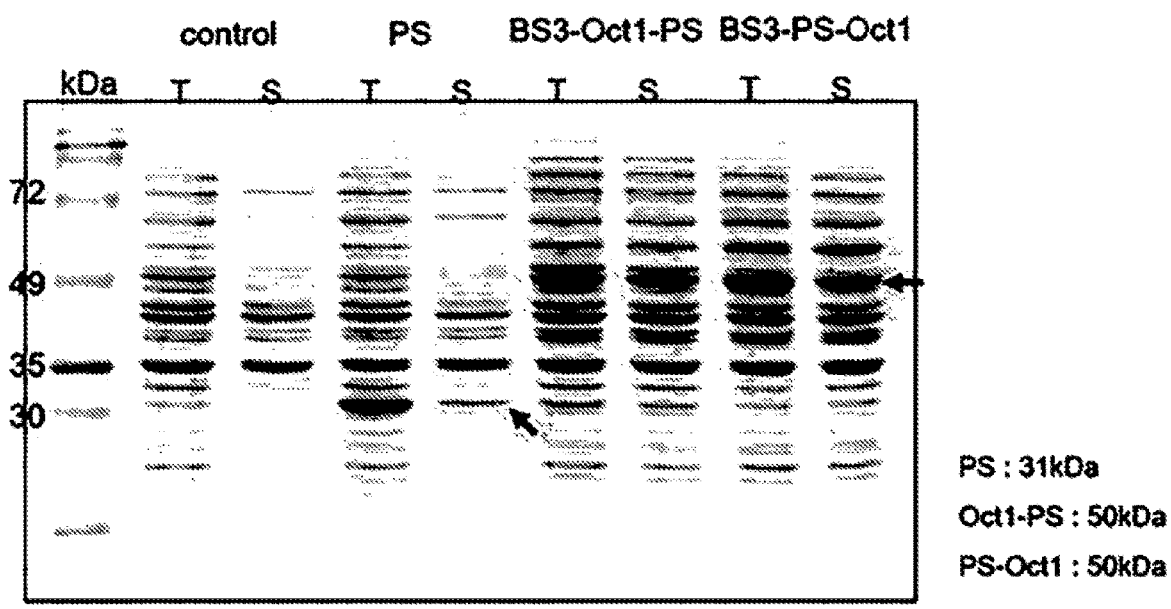
FIG. 3 illustrates the result of SDS-PAGE identifying soluble expression of the fusion protein prepared according to an example of the present invention.

FIG. 3 illustrates the result of SDS-PAGE identifying the soluble expression of proteins after insertion of the 1,2-FT gene corresponding to the POI of the plasmid according to FIG. 2. When the proteins appear in an inactive form, they form aggregates and become insoluble. Therefore, it is important to express proteins in a soluble form in order to maintain the active structure of the proteins. The result of the experiment showed that most of PS to which the Oct-1 protein tag was not bound exhibited expression of proteins in an insoluble form, whereas the PS to which the Oct-1 protein tag was bound exhibited increased expression of proteins in a soluble form. In addition, Oct-1 exhibited the effect of enhancing the soluble expression of the target protein when it was bound either to the N-terminus or to the C-terminus of PS.

Example 3: Application to Biotransformation of Fusion Protein Bound with Protein Tag For application of the fusion protein expressed by the recombinant plasmid constructed in Example 1 to biotransformation, dLM15 strain *E. coli* ΔL M15 from which lacZ was deleted was transformed. As the POI, a 1,2-fucose transferase (1,2-FT) gene, which is a type of fucose transferase (PS), was used. 1,2-FT uses lactose as a substrate in transformants to yield 2'-fucosyllactose (2-FL) as a product (Y. W. Chin et al., Journal of Biotechnology, 210, 2015, pp 107-115).

The transformant was incubated at 37° C. in 10 mL of LB medium containing 50 μg/ml of kanamycin. For the main culture, LB was removed at a constant $OD_{600}$ and the culture was inoculated into 50 mL of R-medium containing an appropriate amount of antibiotics. When $OD_{600}$ reached 0.5, 0.1 mM IPTG and 5 g/L lactose were added thereto, and the culture solution was further incubated at 25° C. or 30° C. and 200 rpm for 84 hours. The cultures were collected at 12-hour intervals for HPLC analysis, and cell concentration was measured using a UV spectrophotometer. For analysis samples, the supernatant was used alone after the cells were removed by centrifugation from the culture.

Example 4: Effect of Fusion Protein Bound with Protein Tag on Improvement of Thermal Stability FIG. 4 illustrates the result of SDS-PAGE identifying the improvement in the thermal stability of proteins after insertion of the 1,2-FT gene as the POI of the plasmid according to FIG. 2 and then culturing at 25° C. for a long time.

E. coli BL21 (DE3) was used to express the fusion protein from the recombinant plasmid. A 1,2-FT gene was used as the POI. A transformant obtained by transformation with the recombinant plasmid was incubated at 25° C. in LB medium containing 50 μg/ml of kanamycin. When the $OD_{600}$ reached 0.5, the transformant was added with 0.1 mM IPTG, and the culture product was further incubated at 25° C. for 28 hours.

Figure 4:
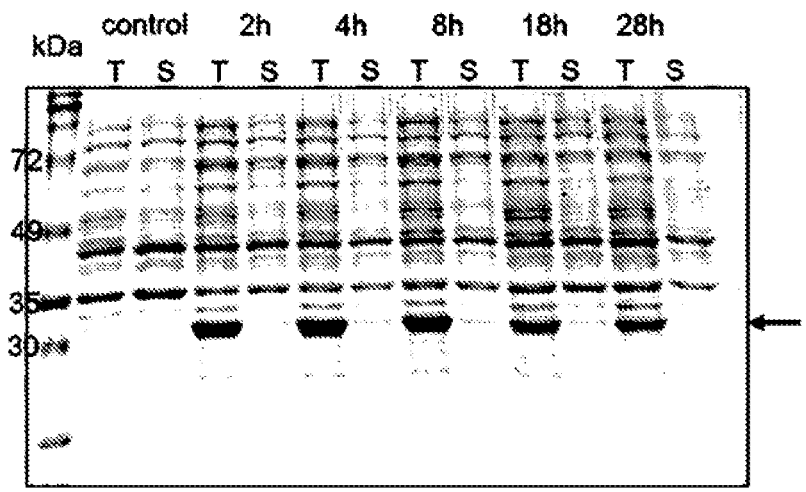
FIG. 4 illustrates the result of SDS-PAGE identifying an increase in the thermal stability of a protein expressed from a recombinant plasmid prepared according to an embodiment of the present invention.
Figure 4:
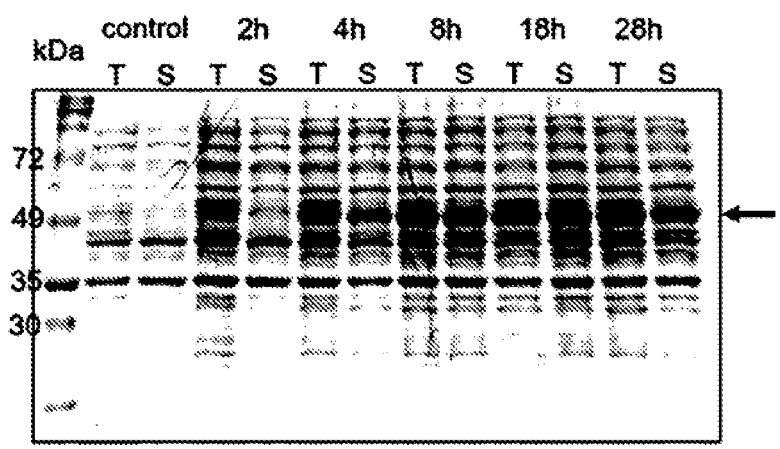
Figure 4:
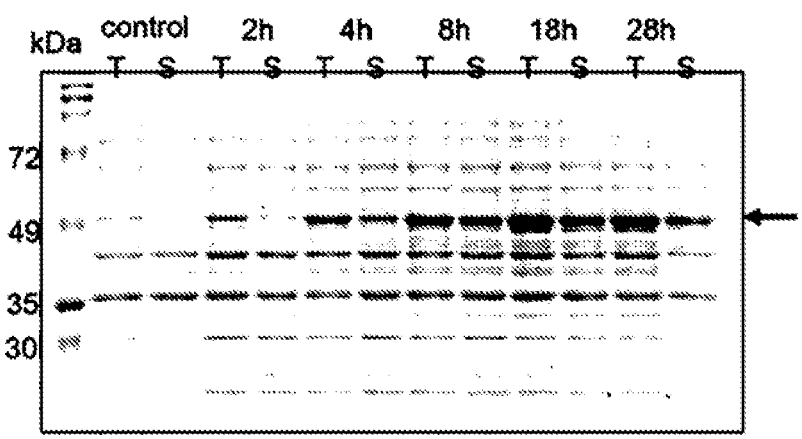

In FIG. 4, A represents a PS protein to which Oct-1 is not bound, B represents a fusion protein in which Oct-1 is bound to the amino terminus of the PS protein, and C represents a fusion protein in which Oct-1 is bound to the carboxyl terminus of the PS protein. As can be seen from FIG. 4, most of the PS to which the Oct-1 protein tag was not bound exhibited expression of proteins in an insoluble form, whereas the PS to which the Oct-1 protein tag was bound exhibited increased expression of proteins in a soluble form and maintained the soluble expression for a long time. In addition, Oct-1 exhibited the effect of enhancing the soluble expression of the target protein regardless of whether it was bound to the N-terminus or the C-terminus of PS.

Example 5: Identification of Necessity for DNA-Binding Sequence

Figure 5:
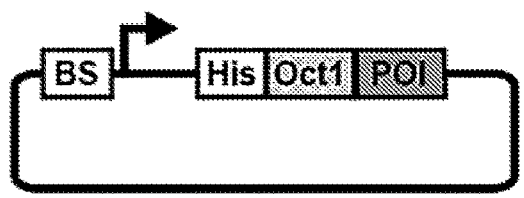
FIG. 5 illustrates the result of a determination as to the necessity of a DNA-binding sequence (BS) of Oct-1 for expression of a fusion protein containing Oct-1.
Figure 5:
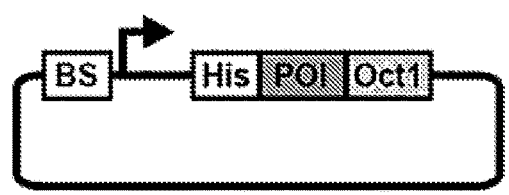
Figure 5:
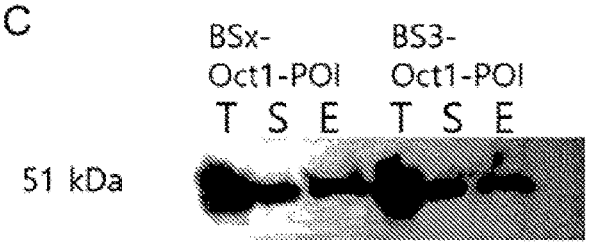
Figure 5:
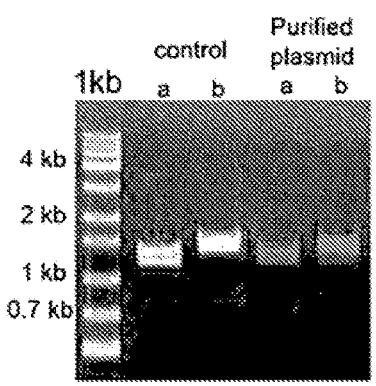
Figure 5:
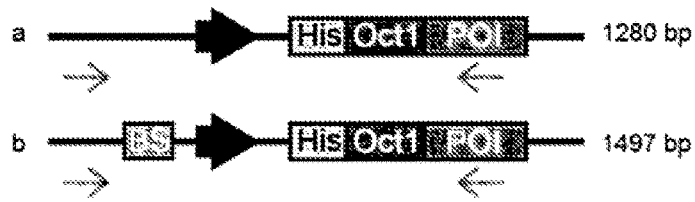

FIG. 5 illustrates the result of a determination as to the necessity to add a DNA-binding sequence (BS) of Oct-1 to the plasmid of FIG. 2 for expression of a fusion protein containing Oct-1. A and B of FIG. 5 are schematic diagrams illustrating a plasmid obtained by inserting BS into the plasmid of FIG. 2, and C to E of FIG. 5 illustrate that the fusion protein containing Oct-1 forms a plasmid-protein complex, regardless of the presence of BS.

The fusion protein was purified using the histidine tag, and the protein for the histidine tag was identified using western blot (C of FIG. 5). In addition, in order to determine whether or not the plasmid is bound to the protein purified using the histidine tag, the DNA forming the protein-DNA complex was purified. The result was amplified, and the gene size was determined through agarose gel electrophoresis. The result showed that the protein was bound to the plasmid (D of FIG. 5). That is, it was found that the fusion protein containing Oct-1 can bind to the plasmid, regardless of the presence of BS, although the BS is a DNA-binding sequence of the Oct-1 protein. This supports the notion that the protein binds to the plasmid in a stable state in the cytoplasm where biotransformation occurs, thereby forming an intracellular immobilized enzyme using the plasmid as an immobilization carrier and thus efficiently increasing product yield when applied to enzymes used for biotransformation.

Example 6: Analysis of Production of Fucosyllactose Through HPLC

Figure 6:
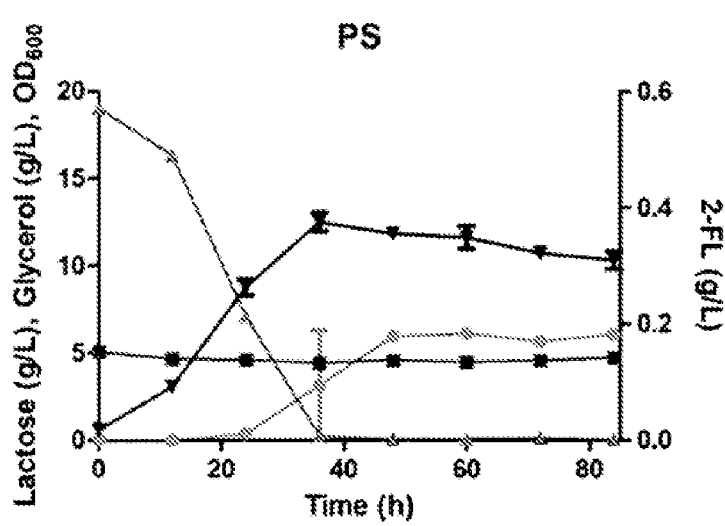
FIG. 6 illustrates the result of high performance liquid chromatography (HPLC) analysis to detect the yield of the final product obtained after biotransformation using a recombinant plasmid prepared according to an embodiment of the present invention.
Figure 6:
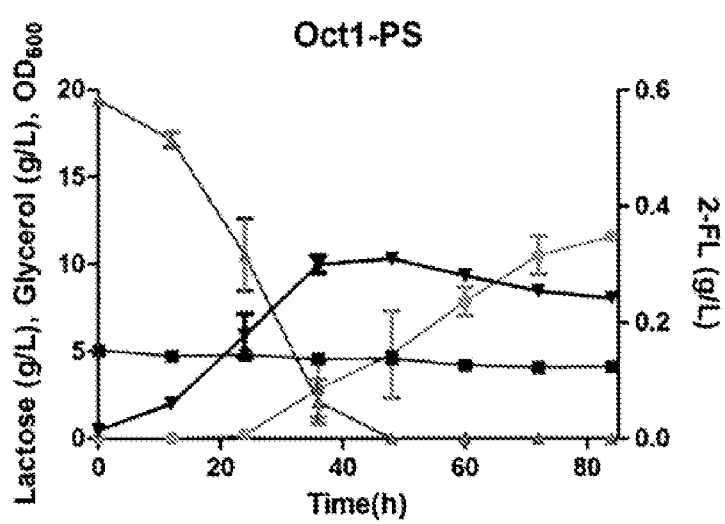
Figure 6:
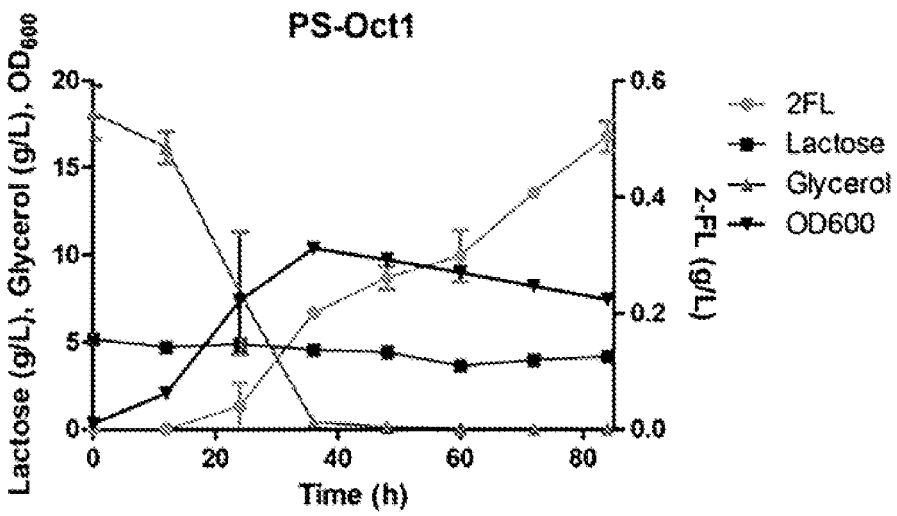

The production (yield) of 2'-fucosyllactose (referred to as "2-FL"), which is a product from the culture, after biotransformation using a plasmid recombined with 1,2-FT (referred to as "PS") and Oct-1 and fermenting the transformant at 25° C., was analyzed by HPLC. The result is shown in FIG. 6. HPLC analysis was performed using a Rezex ROA-organic acid H+ column and a refractive index (RI) detector. Analysis was performed at 50° C. and a flow rate of 0.6 mL/min using 0.01 N sulfuric acid solution as a mobile phase.

FIG. 6 shows the test results for a control group (A), a fusion protein in which Oct-1 is fused to the amino terminus of 1,2-FT (B), and a fusion protein in which Oct-1 is fused to the carboxyl terminus of 1,2-FT (C). Lactose is a carbon source for 2-FL production and $OD_{600}$ is absorbance at 600 nm and is closely related to cell growth. The result of analysis showed, when the protein tag Oct-1 was attached to 1,2-FT, that the production of 2-FL was increased up to 2.5 times.

Example 7: Analysis of Production of Fucosyllactose Through HPLC

The production (yield) of 3'-fucosyllactose (referred to as "3-FL"), which is a product from the culture, after biotransformation using a plasmid recombined with 1,3-FT (referred to as "FT1-1") and Oct-1 and fermenting the transformant at 25° C., was analyzed by HPLC. The result is shown in FIG. 7.

Figure 7:
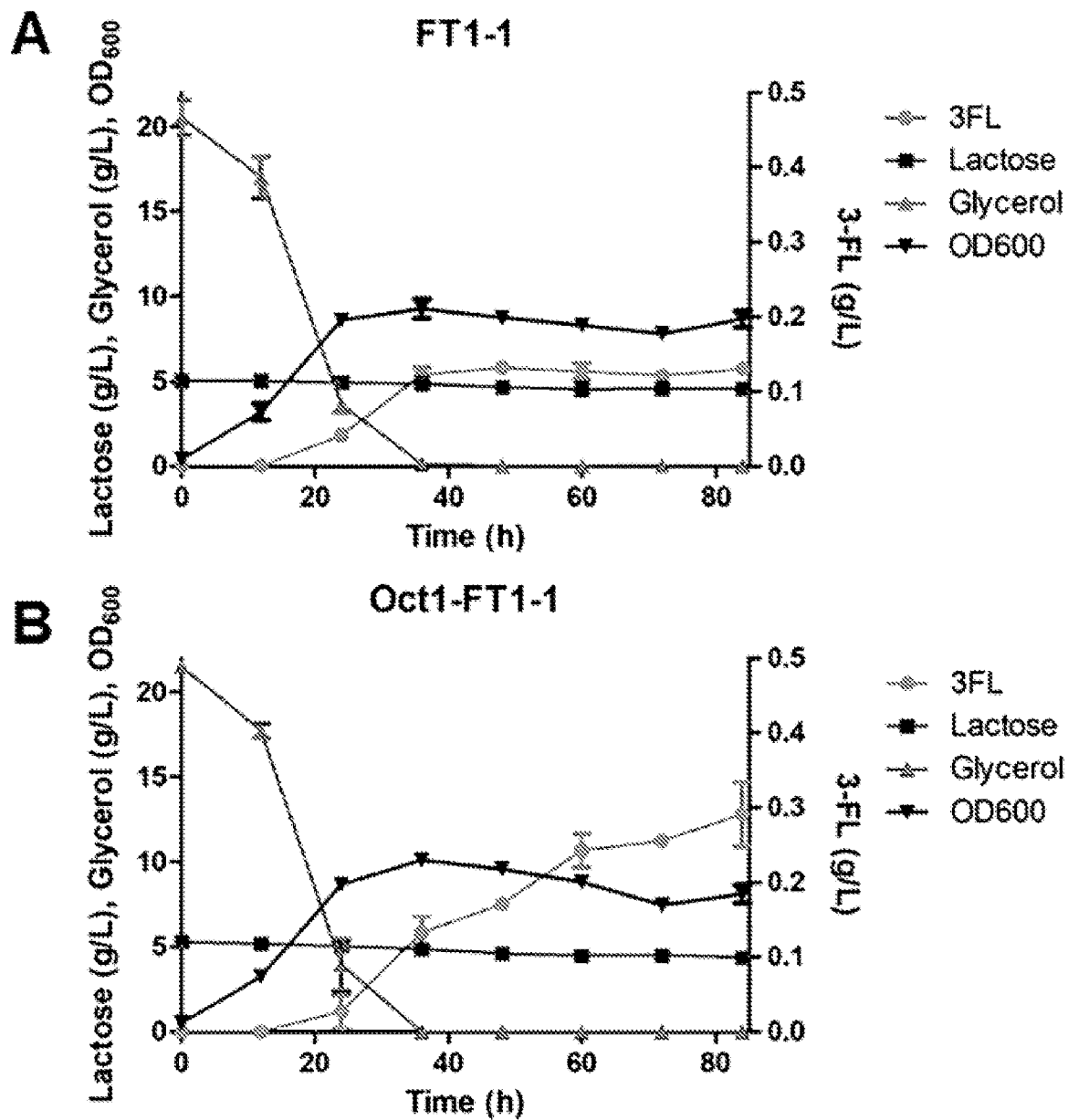
FIG. 7 illustrates the result of high performance liquid chromatography (HPLC) analysis to detect the yield of the final product obtained after biotransformation using the recombinant plasmid prepared according to an embodiment of the present invention.

FIG. 7 shows the test results for a control group (A) and a fusion protein in which Oct-1 is fused to the amino terminus of 1,3-FT (B). The result of analysis showed that when the protein tag Oct-1 was attached to 1,3-FT, the production of 3-FL was increased up to 2.5 times.

Figure 8:
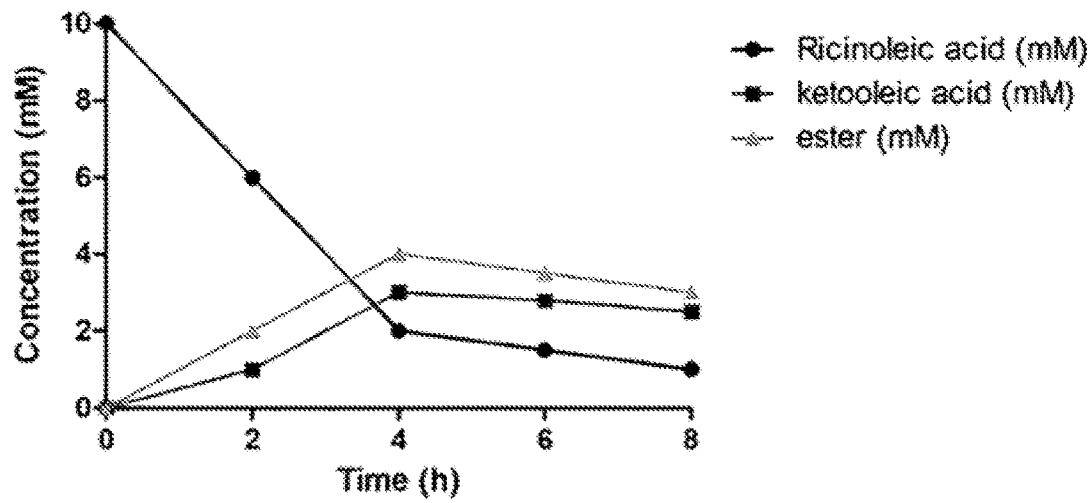
FIG. 8 illustrates the result of gas chromatography (GC) analysis to detect the yield of the final product obtained after biotransformation using the recombinant plasmid prepared according to an embodiment of the present invention.
Figure 8:
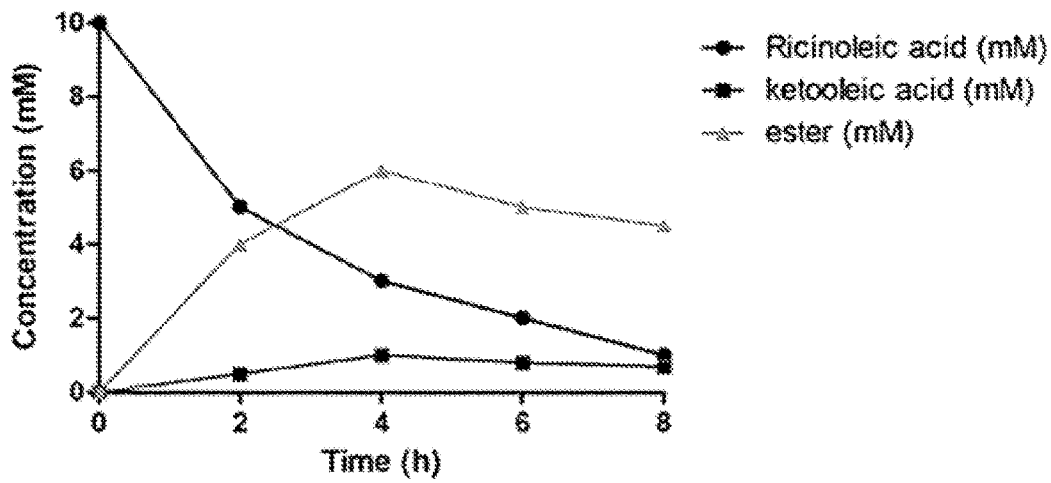
Figure 9:
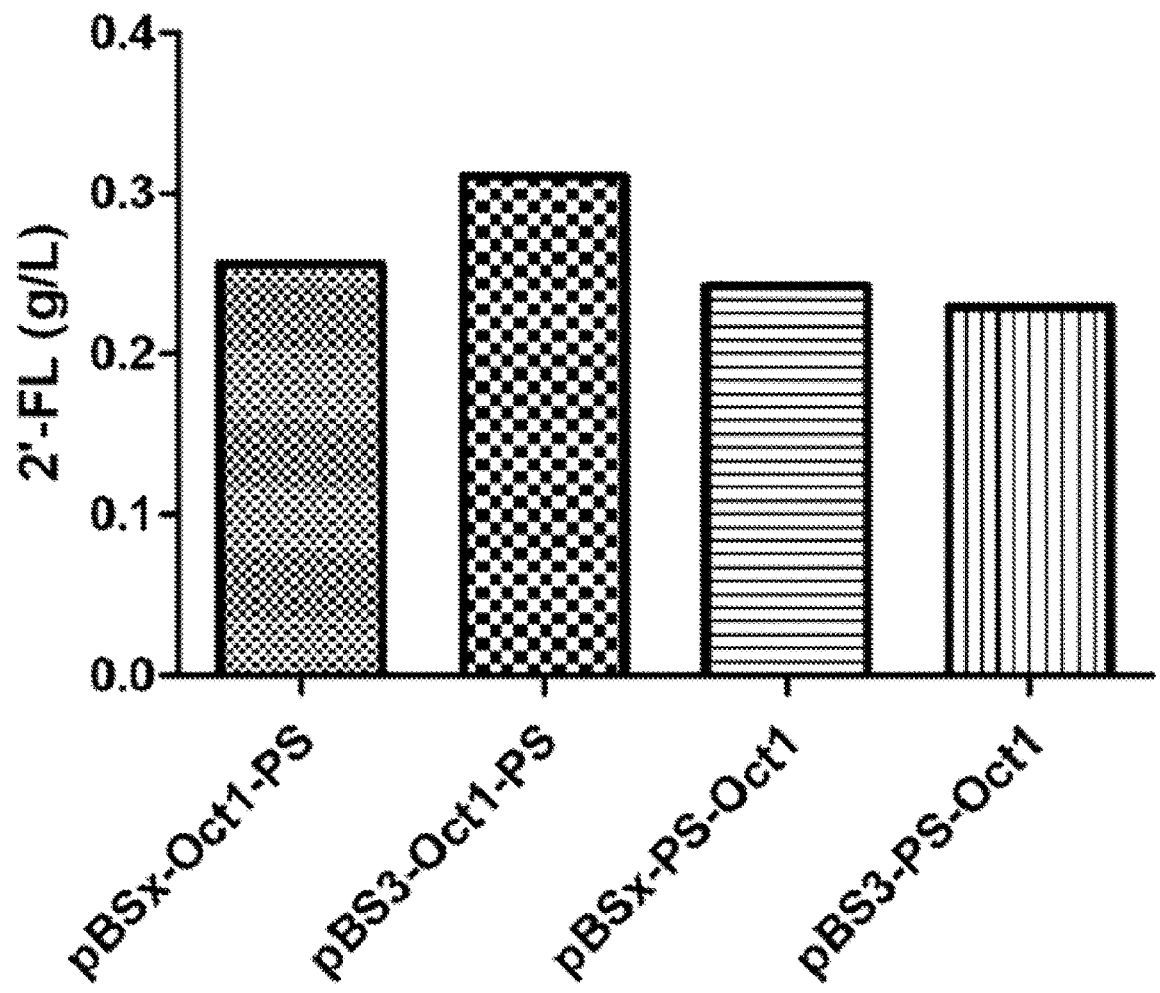
FIG. 9 illustrates the result of high performance liquid chromatography (HPLC) analysis to detect the yield of the final product obtained after biotransformation using a recombinant plasmid including no binding sequence prepared according to an embodiment of the present invention.

Example 8: Analysis of Ester Conversion Efficiency Using Baeyer-Villiger Monooxygenase FIG. 8 shows a graph showing analysis of keto conversion from ricinoleic acid in the culture through gas chromatography after biotransformation using a plasmid recombined with Baeyer-Villiger monooxygenase (BVMO) and Oct-1.

Specifically, the transformed microorganism was inoculated into 50 mL R-medium containing antibiotics, and was incubated at 25° C. in a culture medium supplemented with 0.1 mM IPTG when $OD_{600}$ reached 5. Protein expression was allowed to occur for 2 hours, the pH was adjusted to 8 using KOH, and 10 mM ricinoleic acid was added. During incubation at 35° C., culture samples were collected at 2-hour intervals over a total of 8 hours, and three substances, namely, ricinoleic acid, ester, and keto-oleic acid, were analyzed through gas chromatography.

BVMO is an enzyme used to convert ricinoleic acid to ester. Low efficiency causes accumulation of keto. Compared to A in FIG. 8, which illustrates the result of a test for wild-type BVMO, B of FIG. 8, which illustrates the result of a test for the Oct-1 fusion protein, shows that the ester increased and the amount of keto was relatively small as the amount of ricinoleic acid decreased, so the conversion efficiency of the fusion protein of the present invention increased.

Example 9: Analysis of Production of Fucosyllactose Through HPLC

E. coli ΔL M15 was transformed in the same manner as in Example 3, except that a vector into which no binding sequence (BS, 5'-ATGCAAAT-3') was inserted was used. Then, fucose transferase was used for biotransformation in the same manner as in Example 6, and the content of 2-FL present in the supernatant sample at 72 hours was analyzed through HPLC. The result of the analysis showed that the product yield was increased even in the absence of the binding sequence.

Figure 10:
FIG. 10 is a schematic diagram illustrating a recombinant plasmid for expressing a hemagglutinin fusion protein (Ost1-HA) fused with an Oct-1 protein tag prepared according to an embodiment of the present invention.

Example 10: Construction of Plasmid for Hemagglutinin Soluble Expression Using Oct1 Fusion In order for hemagglutinin (HA), which is a membrane protein of influenza virus, to be expressed in a soluble state when binding to Oct1, a plasmid expressing A/PR8 influenza virus type A HA and a plasmid expressing Oct1 were used. Six histidine-Oct1-TEV protease cleavage site sequences were inserted before the sequence of the HA gene (the gene encoding the amino acid sequence set forth in SEQ ID NO: 5). Gene cloning was performed using overlap cloning, and the sequences of the primers used in the experiment are shown in Table 1 below. The structure of the final plasmid (Oct1-HA) is shown in FIG. 10.

TABLE 1

| Primer | | Sequence | SEQ. ID NO. |
|---|---|---|---|
| Insert (6xHis-Oct1-TEV protease cleavage site) | Forward | AGGAGATATACCATGCATCACCATCATCACCACATGGAGGAGC | 6 |
| | Backward | CAGTAGGTTTGCCTTGAATTCCGGGGATCCCAGGGGC | 7 |
| Vector (pET28b-HA-6XHis) | Forward | AAGGCAAACCTACTGGTCCTGTTATGTGCAC | 8 |
| | Backward | CATGGTATATCTCCTTCTTAAAGTTAAACAAAATTATTTCTAGAGGGG | 9 |

PCR was performed using primers designed such that, in the 6xHis-Oct1-TEV protease cleavage site in the pET-28b plasmid into which HA was inserted, 15 bp at the 3' end of the pET-28b vector including the start codon was complementary to 15 bp at the 5' end of the HA gene excluding the start codon behind the same. After completion of PCR, the result was treated with a Dpn1 solution at 37° C. for 1 hour to digest the methylated template (plasmid), and PCR products other than DNA were removed using a PCR preparation kit. Then, only the insert was treated with T4 kinase at 37° C. for 30 minutes for 5' phosphorylation and then the PCR preparation kit was used once more. In order to ligate the vector (pET28b-HA-6xHis) to the insert (6xHis-Oct1-TEV protease cleavage site), treatment with T4 DNA polymerase, which functions as an exonuclease, was performed for 2 minutes and 30 seconds and treatment with ice was performed for 10 minutes to induce hydrogen bond between the vector and the inserts. 8 µl of the DNA solution obtained through the cloning process was added to 100 µl of the competent E. coli TOP 10 solution and the result was incubated on ice for 30 minutes and then heat-treated at 42° C. for 45 seconds. The reaction solution was added with 900 µl of LB (Luria-Bertani) liquid medium and was then cultured (at 37° C. for 1 hour), and the cells were collected by centrifugation (7,000 rpm, 5 minutes). The collected cell solution (0.1 ml) was seeded and cultured on kanamycin LB solid medium (at 37° C.), and one of colonies that formed was cultured in 10 ml LB liquid medium containing 0.1% kanamycin for 18 hours (at 37° C.). Cells were collected from the culture solution by centrifugation (4,000 rpm, 10 minutes), and the resulting plasmid was obtained using Plasmid DNA Miniprep Kits. The sequence of the plasmid was identified by a third party (Cosmo Jintech, Korea). The sequences of the primers used in the above process are shown in Table 1 above, and the detailed compositions and reaction conditions are shown in Table 2 below.

TABLE 2

| PCR composition | Distilled water 32.5 µl, 5× Phusion GC buffer 10 µl, 10 mM dNTPs 1 µl, 10 µM Forward Primer 2.5 µl, 10 µM Backward Primer 2.5 µl, Template DNA 1 µl, Phusion DNA Polymerase 0.5 µl |
|---|---|
| VectorPCR conditions | Initial denaturation (98° C., 30 sec), 35 cycles: denaturation (98° C., 10 sec) → annealing (61° C., 30 sec) → extension (72° C., 3 min), final extension (72° C., 10 min) |
| InsertPCR conditions | Initial denaturation (98° C., 30 sec), 35 cycles: denaturation (98° C., 10 sec) → annealing (61° C., 30 sec) → extension (72° C., 30 sec), final extension (72° C., 10 min) |
| Dpn1 treatment conditions | 37° C., 1 hour, 5 µl (10× reaction buffer 4) + 44 µl (vectoror insert PCR product) + 1 µl (Dpn1 solution) |
| Ligation | 1 µl (vector solution) + 7.5 µl (insert solution) + 1 µl (10× reaction buffer) + 1 µl (overlap cloner solution) |

Example 11: Hemagglutinin Soluble Expression Test Using Oct1 Fusion

The constructed plasmid was transformed into BL21 (DE3) competent cells through a heat-shock method to perform a test to determine whether or not the protein was expressed. Colonies grown on a solid medium containing 50 µg/ml of kanamycin were inoculated into 10 ml of a liquid medium (terrific broth, TB medium) containing 50 µg/ml of kanamycin and incubated in a shaking incubator at 37° C. for 16 hours to prepare a cell stock containing 15% glycerol. 5 µl of the cell stock was inoculated into 5 ml of liquid medium (terrific broth, TB medium) containing 50 µg/ml of kanamycin and incubated in a shaking incubator at 37° C. for 15 hours, and the cell solution was secondarily inoculated into 25 mL of the same medium. When Escherichia coli grew to an $OD_{600}$ of 0.4 to 0.6 in a shaking incubator at 37° C. and 180 rpm, it was treated with 1 mM isopropyl β-D-1-thiogalactopyranoside (IPTG) to promote protein expression. After protein expression at 25° C. and 120 rpm for 6 hours, the result was diluted 1/10 with TB medium to measure $OD_{600}$. The measured value was obtained by multiplication by a dilution factor of 10. The cell solution was dispensed in an amount of 1 ml and centrifuged at 7,000 rpm for 5 minutes to remove the medium and obtain only the cells. The cells were lysed in PBS (pH 7.4) to adjust the OD$_{600}$ to 7 and 250 µl of the cells were disrupted using ultrasonication. After centrifugation, 100 µl of a soluble fraction was mixed with 20 µl of 6×SDS sample buffer to perform sampling.

Transformation was performed in the same manner as above, except that a plasmid expressing an A/PR8 influenza virus type A HA was used to sample HA that was not fused with Oct1.

The soluble expression of the Oct1-HA fusion protein obtained by the method according to the present invention was compared with that of the HA (not fused with Oct1) protein using western blot.

Figure 11:
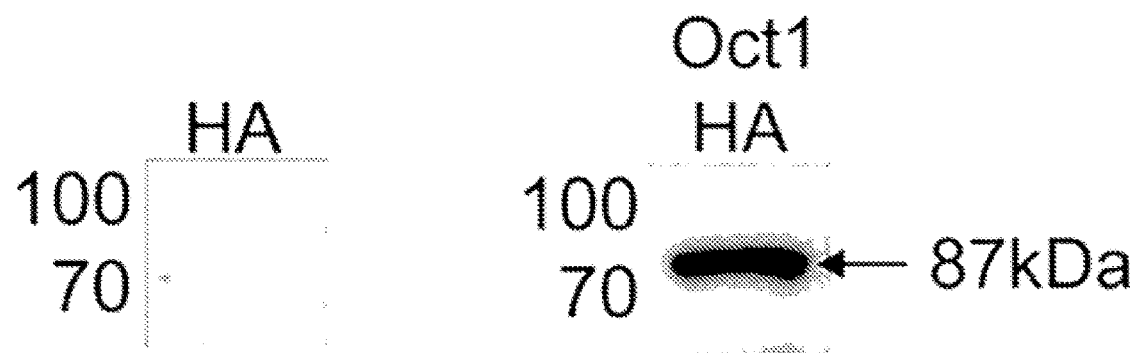
FIG. 11 illustrates the result of Western blot identifying soluble expression of the Oct1-HA fusion protein and the HA protein prepared according to an embodiment of the present invention.

FIG. 11 illustrates the result of Western blot identifying the soluble expression of Oct1-HA fusion protein and HA protein.

It was found that HA was not expressed in a soluble form, but only Oct1-HA was expressed in a soluble form. This indicates that the Oct1-HA fusion protein prepared using the method according to the present invention can be used in a state of expressing protein activity without an additional step after purification.

Example 12: Purification of Oct1-HA Fusion Protein

It was found from Example 11 that the Oct1-HA fusion protein was expressed in a soluble form and purification was performed under the same conditions. 7 µl of the transformed BL21 (DE3) was inoculated into 7 ml of liquid medium (Terrific broth, TB medium) containing µg/ml of kanamycin and incubated in a shaking incubator at 37° C. for 15 hours. Then, 6 ml of the transformed BL21 (DE3) was secondarily inoculated into 600 ml of a fresh batch of the same medium. When *Escherichia coli* grew to an OD$_{600}$ of 0.4 to 0.6 in a shaking incubator at 37° C. and 180 rpm, it was treated with 1 mM isopropyl p-D-1-thiogalactopyranoside (IPTG) to induce protein expression. After protein expression at 25° C. and 120 rpm for 6 hours, centrifugation was performed at 8,000 rpm for 5 minutes to remove the medium and collect only cells. The cells were resuspended using a buffer containing Triton X-100, N-lauroylsarcosine sodium salt, EDTA, and a low concentration of imidazole, and were disrupted using ultrasonication. The cell substrate was isolated through centrifugation, and then Ni-NTA agarose beads were treated therewith. Substances that could not be bound to the beads were removed using the same buffer, and the protein to be purified (Oct1-HA fusion protein) was obtained through a buffer containing a high concentration of imidazole from which N-lauroylsarcosine sodium salt was removed.

Figure 12:
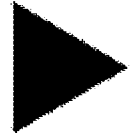
FIG. 12 illustrates the result of SDS-PAGE identifying the expression of the purified Oct1-HA protein using a recombinant plasmid prepared according to an embodiment of the present invention.
Figure 12:
Figure 12:
Figure 12:

FIG. 12 illustrates the result of SDS-PAGE identifying the expression of the purified Oct1-HA protein using the recombinant plasmid.

The result of SDS-PAGE showed that the Oct1-HA fusion protein was normally purified. In addition, it showed that soluble HA having activity in *E. coli* was obtained.

The present invention has been described for illustrative purposes, and it will be obvious to those skilled in the art that the embodiments can be implemented in other specific forms without changing the technical concepts or essential features of the present invention. Therefore, it should be construed that the aforementioned embodiments are illustrative and not restrictive in all respects. For example, respective elements described as having a combined form may be implemented separately, and likewise, elements described as being separate may also be implemented in a combined form.

It should be interpreted that the scope of the present invention is defined by the following claims rather than the above detailed description and all alterations or modifications derived from the meaning and scope of the claims and equivalents thereto fall within the scope of the present invention.

The invention claimed is:

1. A fusion protein comprising:
   a target protein; and
   a protein tag linked to the target protein, the protein tag comprising an octameric transcription factor-1 (Oct-1) protein,
   wherein the Oct-1 protein is encoded by the nucleotide sequence of SEQ ID NO: 1.

2. The fusion protein according to claim 1, wherein the protein tag is linked to an amino terminus or a carboxyl terminus of the target protein.

3. The fusion protein according to claim 1, wherein the target protein comprises at least one selected from the group consisting of an antigen, an antibody, a cell receptor, an enzyme protein, a structural protein, serum and a cellular protein.

4. The fusion protein according to claim 3, wherein the enzyme protein is selected from fucose transferases, Baeyer-Villiger monooxygenases (BVMOs), and combinations thereof.

5. The fusion protein according to claim 3, wherein the antigen is selected from hemagglutinin (HA), neuraminidase (NA), and combinations thereof.

* * * * *

SEQUENCE LISTING

```
<160> NUMBER OF SEQ ID NOS: 9

<210> SEQ ID NO 1
<211> LENGTH: 483
<212> TYPE: DNA
<213> ORGANISM: Artificial Sequence
<220> FEATURE:
<223> OTHER INFORMATION: human Oct-1 sequence

<400> SEQUENCE: 1
atggaggagc ccagtgacct tgaggagctt gagcagtttg ccaagacctt caaacaaaga      60
cgaatcaaac ttggattcac tcagggtgat gttgggctcg ctatggggaa actatatgga     120
aatgacttca gccaaactac catctctcgc tttgaagcct tgaacctcag ctttaagaac     180
atgtgcaagt tgaagccact tttagagaag tggctaaatg atgcagagaa cctctcatct     240
gattcgtccc tttccagccc aagtgccctg aattctccag gaattgaggg cttgagccgt     300
aggaggaaga aacgcaccag catagagacc aacatccgtg tggccttaga gaagagtttc     360
ttggagaatc aaaagcctac ctcggaagag atcactatga ttgctgatca gctcaatatg     420
gaaaaagagg tgattcgtgt ttggttctgt aatcgccgcc agaaagaaaa aagaatcaac     480
cca                                                                   483

<210> SEQ ID NO 2
<211> LENGTH: 804
```

```
<212> TYPE: DNA
<213> ORGANISM: Artificial Sequence
<220> FEATURE:
<223> OTHER INFORMATION: 1,2-FT DNA sequence

<400> SEQUENCE: 2
atgatatttg taaccggata tggccagatg tgtaacaaca tccttcaatt tgggcatttc    60
tttgcttatg caaaagaaa tggtttaaaa acggttggct tacgttttg ctacaaatac    120 acttttttca agattagtaa cgaaaaaggc tataattggc cgacctatct ttatgcaaaa   180
tatggggcaa aaataggact tataaagtct gttgattttg acgaatcatt cgaaggtaca   240
aatgtagatt ctcttcaatt agacaaacaa accgtgttag ccaaaggctg gtattttaga   300
gactaccagg gatttcttaa ttaccgtaat gagcttaaag cacttttcga ctttaaagag   360
catattaaga aaccggtaga acagtttttt tcaacgttat caaagacac catcaaagta    420 ggcctgcata taagacgtgg tgattataag acctggcacc agggtaaata cttttttagc   480
gacgaagaat acggtcaaat cgtaaattct tttgctaaaa gtttagataa accggtagaa   540
ttaattattg ttagcaatga tcccaaacta acagcaaaa gttttgaaaa tttaacatcc    600
tgtaaagtat caatgttaaa tggcaatcct gccgaagatc tttaccttct ttctaaatgt   660
gattatatta ttggccctcc cagcactttt tctttaatgg cagcttttta cgaagaccgc   720
cctttatatt ggatatttga taagaaaaaa cagcttttag cagaaaactt tgacaagttc   780
gagaatctgt ttcgacacat tatt                                          804

<210> SEQ ID NO 3
<211> LENGTH: 1365
<212> TYPE: DNA
<213> ORGANISM: Artificial Sequence
<220> FEATURE:
<223> OTHER INFORMATION: 1,3-FT DNA sequence

<400> SEQUENCE: 3
atgttccagc cccttctcga tgccttcata gagagcgcat ccattgagaa aatggcctct   60
aaatctcccc cgcccctaaa gatcgccgtg gcgaattggt ggggtgatga agaaattaaa   120
gaatttaaga agagcactct gtactttatt cttagtcagc attacacaat cactttacac   180
cgaaaccctg ataaaccagc cgacatcgtt tttggtaacc cacttggatc agcccgcaaa   240
atcttatctt accaaaacac aaaacgaata ttttacacgg gtgaaaacga atcgcctaat   300
ttcaacctct tgactatgc cataggcttt gatgaactgg actttagaga tcggtattta   360
cgcatgccgc tttattatga ccgtctgcac cataaggcgg agagcgtgaa tgacactacc   420
gcaccgtata agattaaagg caacagcctt tataccttaa agaaacccag ccattgcttt   480
aaagaaaatc accctaacct gtgcgcactt atcaataatg agagcgatcc actcaaacgc   540
gggttcgcaa gttttgtagc gagcaacgcg aacgctccga tgcggaacgc ttttatgat   600 gcattaaact cgatagagcc agttacaggg gtgagccg tgaaaacac actgggctat    660 aaggtcggaa acaagagcga attttaagc cagtacaaat tcaatctgtg ttttgagaat   720
tcacagggct acggttacgt caccgaaaaa atcattgatg catactttag tcatactatc   780
ccgatttatt gggggtcacc gagcgtggcg aaagatttca acccgaaaag ttttgtcaac   840
gttcatgatt tcaacaattt tgacgaggcg attgactacg tgagatacct gcatacgcac   900
cccaacgctt atctggatat gctctatgaa aatccattaa ataccctgga cggcaaagct   960
tacttttacc agaatctgag ttttaaaaaa atcctagatt tctttaaaac gattctggaa   1020
```

| aacgacacga | tttatcataa | taatcctttc | atttttatc | gtgacctgaa | tgagccgctg | 1080 |
| gtatccattg | ataatctgcg | tatcaactat | gataatttgc | gggtgaatta | tgatgatttg | 1140 |
| cgcgttaact | atgatgactt | gcgtgttaac | tatgatgact | tgcggatcaa | ctatgatgat | 1200 |
| ctgcgtataa | actatgatga | cttgagaatt | aattatgagc | gccttctgca | aaacgcttca | 1260 |
| ccgctgctgg | aattgagcca | gaatacctca | ttcaaaatct | accgcaaaat | ttatcaaaaa | 1320 |
| tccctcccgt | tacttcgtgt | aataaggcgt | tgggttaaaa | agtaa | | 1365 |

```
<210> SEQ ID NO 4
<211> LENGTH: 1542
<212> TYPE: DNA
<213> ORGANISM: Artificial Sequence
<220> FEATURE:
<223> OTHER INFORMATION: BVMO DNA sequence

<400> SEQUENCE: 4
```

| atggaagaag | aagaagaaga | atcttctcac | accgcactgc | ctgttgagcc | actcgacgta | 60 |
| ctgatcatgg | gtgctggtgt | tccggtatc | ggcgctgcag | cttatctgcg | tcgtaaccag | 120 |
| ccgaacaaaa | ccttcgctat | tctggagtct | cgcgagcgta | tgggcggtac | ctgggatctg | 180 |
| ttccgctacc | cgggcatccg | ttctgactcc | gacctgtaca | ctttcggttt | cgacttcaag | 240 |
| ccgtggacca | agcgaaatc | cctggccgat | gctgctgaca | tcctggaata | cctgtccgaa | 300 |
| gcgatcgacg | aacaccagct | ggcgccgttc | atccagtacc | agcagaaagt | catttctgct | 360 |
| aactggcaga | gcgacaaagg | cctgtggtct | gttcgtgtag | aagacggtcg | tactgcacag | 420 |
| attcgtaccg | ttgaatgccg | ctggctgttc | tctgcgggtg | ttactaccg | ttacgatcag | 480 |
| ggcttcagcc | cgcgtttcga | aggtagcgaa | cagttcaaag | gtcagatcat | tcacccgcag | 540 |
| cactggccgg | aagatctgga | ctacaccggt | aaacgtgtgg | ttgttatcgg | ttctggtgcg | 600 |
| accgctgtaa | cccttatccc | ggcgatggca | gacaaagttg | cttctatcac | catgctgcaa | 660 |
| cgcactccgt | cttacatcat | caaccaaccg | gcaaacgatg | gtgtggcggc | gttcctgcgc | 720 |
| aaagtgctgc | cggctcagac | cgcctattct | ctgacccgtt | ataaaaacgc | taaaatcact | 780 |
| ctggcattct | ggggctttg | ccagcgcttc | ccgaagctga | gcaaaaaact | gttgctgtgg | 840 |
| ctgactcgta | agaactgcc | gaaagactat | ccggttgacg | ttcacttcaa | cccgccgtat | 900 |
| aacccgtggg | accagcgtct | gtgctccgta | cctgaaggcg | acctgtttaa | agcaatctcc | 960 |
| gcaggcaacg | cggatatcgt | tactgatcac | atcgaacgct | tcaccgagca | cggcgtactg | 1020 |
| ctgaagagcg | gtaaaatgtt | gaaagccgac | attatcgtca | ccgcgactgg | cctgaacgtt | 1080 |
| cagttgttcg | gcggcattac | cctgcataaa | gatggcaaac | cggtagttct | gtctgaaacc | 1140 |
| ctggcttaca | aagtatgat | gctgtctggc | gtgccaaact | tcgcgtttgc | tgttggctat | 1200 |
| accaacagct | cctggacgct | gaaagtttgc | ctgctgtgtg | accacttctg | ccgtctgctg | 1260 |
| ggtctgatgg | aacgtgaagg | ctacaacgtc | tgtgaaccga | agctccgga | aggcgttgaa | 1320 |
| acgcgtccgc | tgcttgattt | tggtgcaggt | tatgtgcagc | gtgcgctgga | ttccatgccg | 1380 |
| cgccagggtc | cgcgtgagcc | gtgggtgatg | agcatggatt | acttccgtga | tgtgaaactg | 1440 |
| ctgcgtcgcg | gcgcagtgac | cgataaatgc | ctgaaattca | ctgcggttcc | gaacgcaccg | 1500 |
| ctgcacgctg | atgtacagct | gcagcagcaa | ggcagccgcc | gt | | 1542 |

```
<210> SEQ ID NO 5
<211> LENGTH: 565
<212> TYPE: PRT
<213> ORGANISM: Artificial Sequence
```

<220> FEATURE:
<223> OTHER INFORMATION: HA peptide sequence

<400> SEQUENCE: 5

```
Lys Ala Asn Leu Leu Val Leu Leu Cys Ala Leu Ala Ala Ala Asp Ala
1               5                   10                  15

Asp Thr Ile Cys Ile Gly Tyr His Ala Asn Asn Ser Thr Asp Thr Val
            20                  25                  30

Asp Thr Val Leu Glu Lys Asn Val Thr Val Thr His Ser Val Asn Leu
        35                  40                  45

Leu Glu Asp Ser His Asn Gly Lys Leu Cys Arg Leu Lys Gly Ile Thr
    50                  55                  60

Pro Leu Gln Leu Gly Lys Cys Asn Ile Ala Gly Trp Leu Leu Gly Asn
65                  70                  75                  80

Pro Glu Cys Asp Leu Leu Leu Pro Val Arg Ser Trp Ser Tyr Ile Val
                85                  90                  95

Glu Thr Pro Asn Ser Glu Asn Gly Ile Cys Tyr Pro Gly Asp Phe Ile
            100                 105                 110

Asp Tyr Glu Glu Leu Arg Glu Gln Leu Ser Ser Val Ser Ser Phe Glu
        115                 120                 125

Arg Phe Glu Ile Phe Pro Lys Glu Ser Ser Trp Pro Asn His Thr Thr
    130                 135                 140

Thr Arg Gly Val Thr Ala Ala Cys Ser His Ala Gly Lys Ser Ser Phe
145                 150                 155                 160

Tyr Arg Asn Leu Leu Trp Leu Thr Glu Lys Glu Gly Ser Tyr Pro Lys
                165                 170                 175

Leu Lys Asn Ser Tyr Val Asn Lys Lys Gly Lys Glu Val Leu Val Leu
            180                 185                 190

Trp Gly Ile His His Pro Ser Asn Ser Lys Asp Gln Gln Lys Leu Tyr
        195                 200                 205

Gln Asn Glu Asn Ala Tyr Val Ser Val Val Ser Ser Asn Tyr Asn Arg
    210                 215                 220

Arg Phe Thr Pro Glu Ile Ala Glu Arg Pro Lys Val Arg Asp Gln Ala
225                 230                 235                 240

Gly Arg Met Asn Tyr Tyr Trp Thr Leu Leu Lys Pro Gly Asp Thr Ile
                245                 250                 255

Ile Phe Glu Ala Asn Gly Asn Leu Val Ala Pro Arg Tyr Ala Phe Ala
            260                 265                 270

Leu Ser Arg Gly Phe Gly Ser Gly Ile Ile Thr Ser Asn Ala Ser Met
        275                 280                 285

His Glu Cys Asn Thr Lys Cys Gln Thr Pro Leu Gly Ala Ile Asn Ser
    290                 295                 300

Ser Leu Pro Phe Gln Asn Ile His Pro Val Thr Ile Gly Glu Cys Pro
305                 310                 315                 320

Lys Tyr Val Arg Ser Ala Lys Leu Arg Met Val Thr Gly Leu Arg Asn
                325                 330                 335

Ile Pro Ser Ile Gln Ser Arg Gly Leu Phe Gly Ala Ile Ala Gly Phe
            340                 345                 350

Ile Glu Gly Gly Trp Thr Gly Met Ile Asp Gly Trp Tyr Gly Tyr Gln
        355                 360                 365

His Gln Asn Glu Gln Gly Ser Gly Tyr Ala Ala Asp Gln Lys Ser Thr
    370                 375                 380

Gln Asn Ala Ile Asn Gly Ile Thr Asn Lys Val Asn Ser Val Ile Glu
385                 390                 395                 400
```

Lys Met Asn Thr Gln Phe Thr Ala Val Gly Lys Glu Phe Asn Lys Leu
            405                 410                 415

Glu Lys Arg Met Glu Asn Leu Asn Lys Lys Val Asp Asp Gly Phe Leu
        420                 425                 430

Asp Ile Trp Thr Tyr Asn Ala Glu Leu Leu Val Leu Leu Glu Asn Glu
            435                 440                 445

Arg Thr Leu Asp Phe His Asp Ser Asn Val Lys Asn Leu Tyr Glu Lys
        450                 455                 460

Val Lys Ser Gln Leu Lys Asn Asn Ala Lys Glu Ile Gly Asn Gly Cys
465                 470                 475                 480

Phe Glu Phe Tyr His Lys Cys Asp Asn Glu Cys Met Glu Ser Val Arg
                485                 490                 495

Asn Gly Thr Tyr Asp Tyr Pro Lys Tyr Ser Glu Glu Ser Lys Leu Asn
            500                 505                 510

Arg Glu Lys Val Asp Gly Val Lys Leu Glu Ser Met Gly Ile Tyr Gln
        515                 520                 525

Ile Leu Ala Ile Tyr Ser Thr Val Ala Ser Ser Leu Val Leu Leu Val
            530                 535                 540

Ser Leu Gly Ala Ile Ser Phe Trp Met Cys Ser Asn Gly Ser Leu Gln
545                 550                 555                 560

Cys Arg Ile Cys Ile
            565

<210> SEQ ID NO 6
<211> LENGTH: 43
<212> TYPE: DNA
<213> ORGANISM: Artificial Sequence
<220> FEATURE:
<223> OTHER INFORMATION: Insert primer (6xHis-Oct1-TEV protease cleavage
      site) forward sequence

<400> SEQUENCE: 6
aggagatata ccatgcatca ccatcatcac cacatggagg agc                 43

<210> SEQ ID NO 7
<211> LENGTH: 37
<212> TYPE: DNA
<213> ORGANISM: Artificial Sequence
<220> FEATURE:
<223> OTHER INFORMATION: Insert primer (6xHis-Oct1-TEV protease cleavage
      site) backward sequence

<400> SEQUENCE: 7
cagtaggttt gccttgaatt ccggggatcc caggggc                       37

<210> SEQ ID NO 8
<211> LENGTH: 31
<212> TYPE: DNA
<213> ORGANISM: Artificial Sequence
<220> FEATURE:
<223> OTHER INFORMATION: Vector primer (pET28b-HA-6XHis) forward
      sequence

<400> SEQUENCE: 8
aaggcaaacc tactggtcct gttatgtgca c                             31

<210> SEQ ID NO 9
<211> LENGTH: 48
<212> TYPE: DNA
<213> ORGANISM: Artificial Sequence
<220> FEATURE:

```
<223> OTHER INFORMATION: Vector primer (pET28b-HA-6XHis) backward
      sequence

<400> SEQUENCE: 9
catggtatat ctccttctta aagttaaaca aaattatttc tagagggg                48
```